United States Patent
Suzuki et al.

(10) Patent No.: US 9,694,821 B2
(45) Date of Patent: Jul. 4, 2017

(54) DRIVE CONTROL DEVICE FOR VEHICLE

(71) Applicants: Takeaki Suzuki, Susono (JP); Masaki Matsunaga, Odawara (JP); Yasunari Kido, Hadano (JP); Takayuki Kogure, Susono (JP); Yukari Okamura, Gotenba (JP); Rentaro Kuroki, Susono (JP); Takuya Hirai, Susono (JP); Masaki Mitsuyasu, Kawasaki (JP); Jonggap Kim, Hadano (JP); Akihiro Sato, Nagoya (JP); Yusuke Kinoshita, Toyota (JP)

(72) Inventors: Takeaki Suzuki, Susono (JP); Masaki Matsunaga, Odawara (JP); Yasunari Kido, Hadano (JP); Takayuki Kogure, Susono (JP); Yukari Okamura, Gotenba (JP); Rentaro Kuroki, Susono (JP); Takuya Hirai, Susono (JP); Masaki Mitsuyasu, Kawasaki (JP); Jonggap Kim, Hadano (JP); Akihiro Sato, Nagoya (JP); Yusuke Kinoshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 191 days.

(21) Appl. No.: 14/413,237

(22) PCT Filed: Oct. 15, 2013

(86) PCT No.: PCT/IB2013/002310
§ 371 (c)(1),
(2) Date: Jan. 7, 2015

(87) PCT Pub. No.: WO2014/060825
PCT Pub. Date: Apr. 24, 2014

(65) Prior Publication Data
US 2015/0158491 A1 Jun. 11, 2015

(30) Foreign Application Priority Data

Oct. 19, 2012 (JP) .................................. 2012-232308

(51) Int. Cl.
*B60W 30/18* (2012.01)
*B60W 10/02* (2006.01)
*B60W 10/06* (2006.01)

(52) U.S. Cl.
CPC ...... *B60W 30/18072* (2013.01); *B60W 10/02* (2013.01); *B60W 10/06* (2013.01);
(Continued)

(58) Field of Classification Search
CPC ................ B60W 10/02; B60W 10/06; B60W 30/18072; B60W 2030/1809; B60W 2550/142
See application file for complete search history.

(56) References Cited

U.S. PATENT DOCUMENTS 9,045,130 B2 * 6/2015 Sano ...................... F02D 29/02
2015/0151761 A1 * 6/2015 Suzuki ............ B60W 30/18072
701/67
(Continued)

FOREIGN PATENT DOCUMENTS

JP 2002-227885 8/2002
JP 2006-312982 A 1/2006
(Continued)

*Primary Examiner* — Jacob S Scott
(74) *Attorney, Agent, or Firm* — Finnegan, Henderson, Farabow, Garrett & Dunner, LLP

(57) ABSTRACT

An upper limit value of an upward gradient of a road surface for starting neutral coasting is set to be larger than an upper limit of the upward gradient of the road surface for starting free-run coasting, so, when the upward gradient is relatively large and a coasting distance is short, the vehicle is caused to travel in the neutral coasting, and stop and restart of the engine are not carried out. Therefore, a decrease in driv-
(Continued)

ability of the vehicle is suppressed. When the upward gradient is relatively small and the coasting distance is long, the vehicle is caused to travel in the free-run coasting, and supply of fuel to the engine is stopped, so fuel economy of the vehicle is obtained. Thus, it is possible to achieve both fuel economy and drivability of the vehicle during coasting on an upward gradient.

2 Claims, 5 Drawing Sheets

(52) U.S. Cl.
CPC ............... *B60W 2030/1809* (2013.01); *B60W 2550/142* (2013.01)

(56) References Cited

U.S. PATENT DOCUMENTS

2015/0166065 A1* 6/2015 Kuroki .................. B60W 10/02
477/185
2015/0291171 A1* 10/2015 Kuroki .................... F02D 41/12
701/70

FOREIGN PATENT DOCUMENTS

| JP | 2009-264513 A | 11/2009 |
| JP | 2014-84905 | 5/2014 |
| WO | WO 2014/060823 A1 | 4/2014 |

* cited by examiner

FIG. 2
| DRIVE MODE | ENGINE 12 | CLUTCH C1 | ENGINE BRAKING FORCE | NEGATIVE PRESSURE SUPPLY |
|---|---|---|---|---|
| ENGINE BRAKING TRAVELING | DRIVEN FOR ROTATION | ENGAGED | LARGE | SUPPLIED |
| FREE-RUN COASTING | F/C, ROTATION IS STOPPED | RELEASED | SMALL | NOT SUPPLIED |
| NEUTRAL COASTING | OPERATED AT IDLE | RELEASED | SMALL | SUPPLIED |
FIG. 3
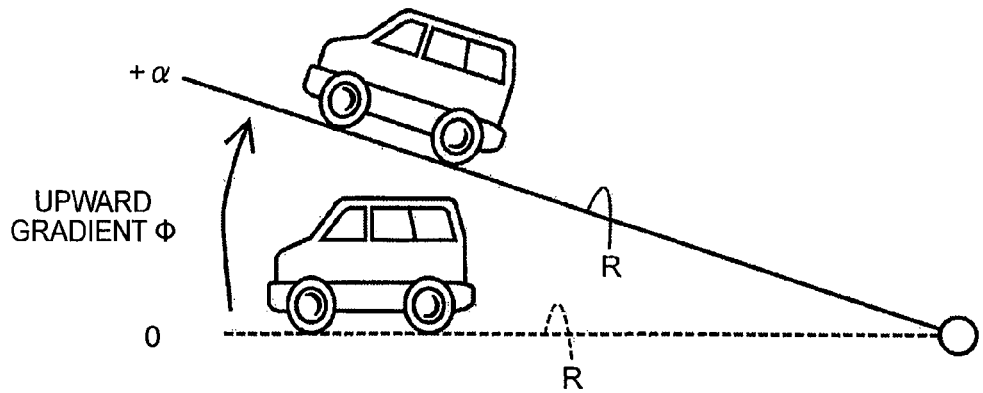
FIG. 4
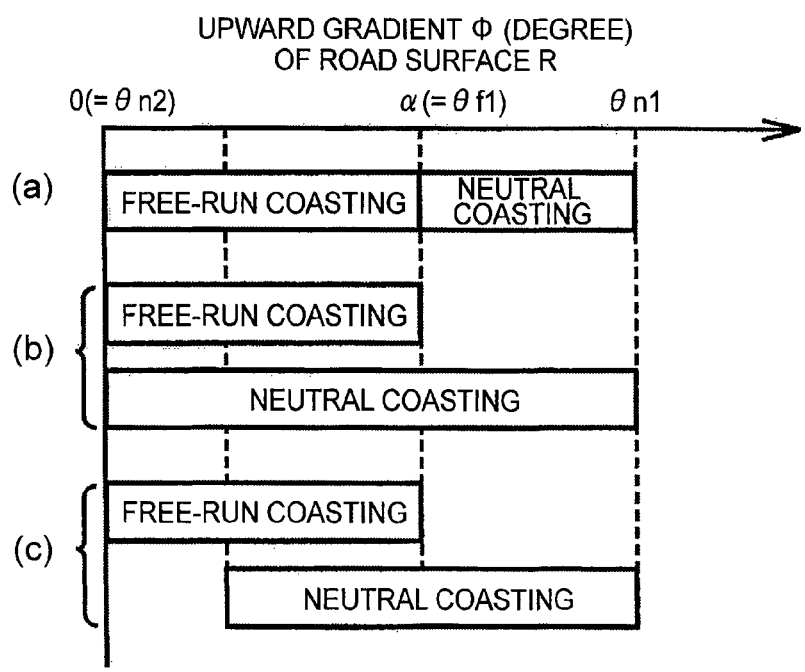

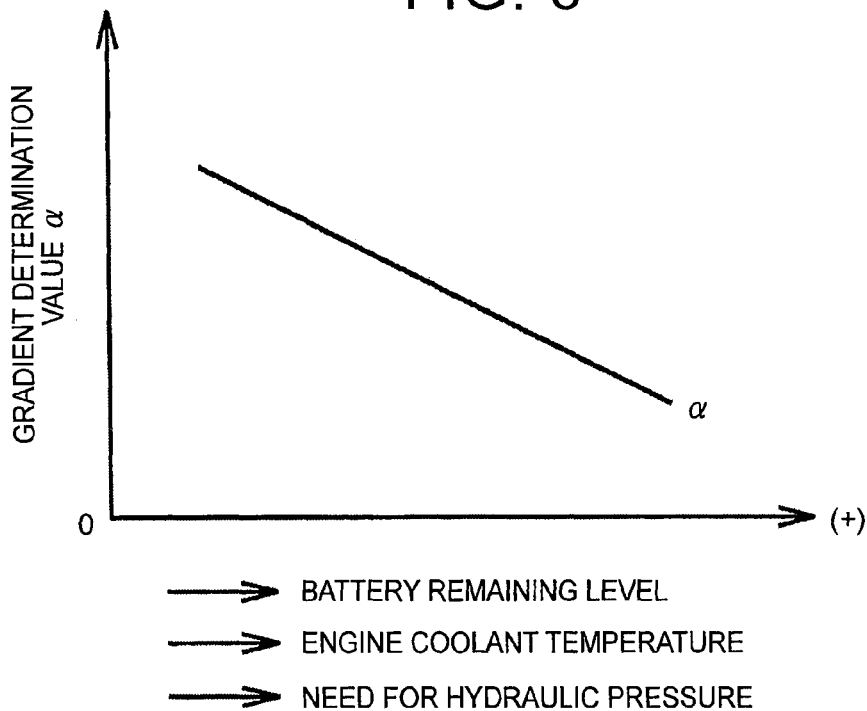
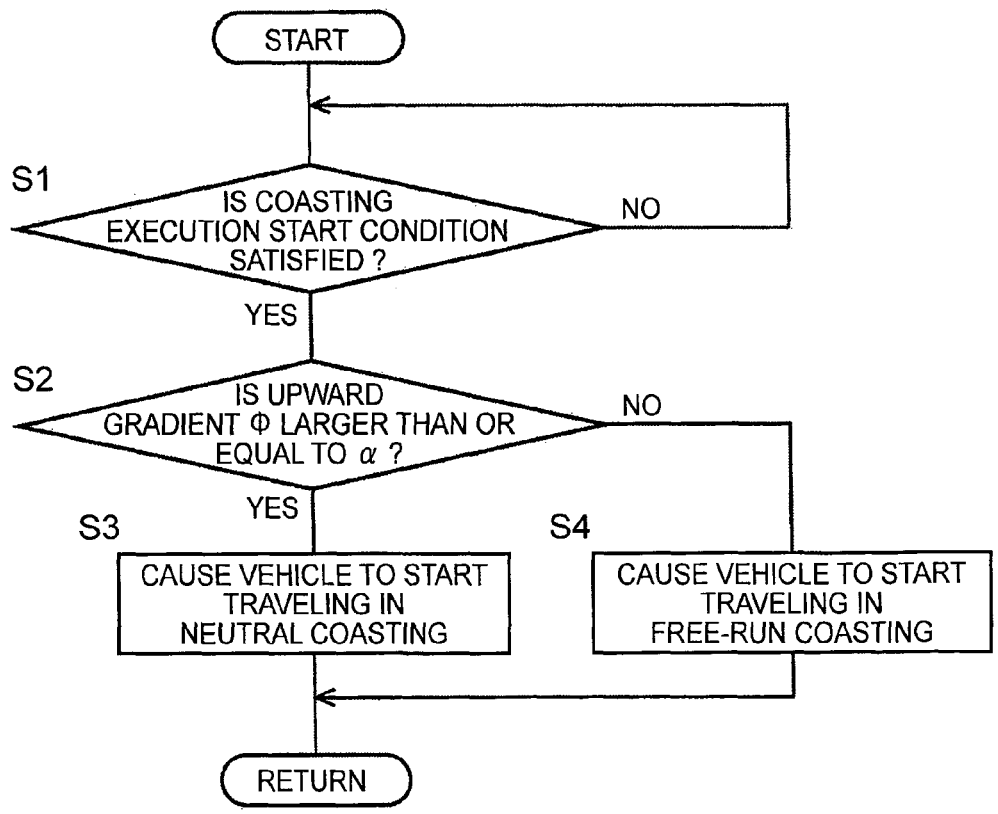

DRIVE CONTROL DEVICE FOR VEHICLE

CROSS-REFERENCE TO RELATED APPLICATIONS

This application is a national phase application of International Application No. PCT/IB2013/002310, filed Oct. 15, 2013, and claims the priority of Japanese Application No. 2012-232308, filed Oct. 19, 2012, the content of both of which is Incorporated herein by reference.

BACKGROUND OF THE INVENTION

1. Field of the Invention

The invention relates to a drive control device for a vehicle and, more particularly, to a technique for, in the vehicle that is able to travel in coasting, that is, in a state where engine braking force is decreased as compared to that in engine braking traveling, achieving both fuel economy and drivability of the vehicle during coasting on an upward-gradient road surface.

2. Description of Related Art

In contrast to engine braking traveling in which a vehicle travels while engine braking is being applied through driven rotation of an engine in a state where a power transmission path between the engine and wheels remains connected, there is conceivably coasting in which a vehicle travels while engine braking force is decreased as compared to that in the engine braking traveling in order to contribute to improvement in fuel economy by extending a travel distance. One example is a device described in Japanese Patent Application Publication No. 2002-227885 (JP 2002-227885 A). The device is configured to, when it is determined that an accelerator pedal has been returned while the vehicle is traveling, the vehicle is caused to start coasting by releasing a clutch provided in a power transmission path between an engine and wheels, thus improving the fuel economy of the vehicle.

Incidentally, the coasting of the vehicle conceivably includes free-run coasting in which the engine is disconnected from the wheels by releasing the clutch in the power transmission path and rotation of the engine is stopped by stopping supply of fuel to the engine and neutral coasting in which the engine is operated by being supplied with fuel in a state where the engine is disconnected from the wheels by releasing the clutch in the power transmission path. However, JP 2002-227885 A does not consider in which coasting the vehicle is caused to travel on the basis of an upward gradient of a road surface at the time when the vehicle starts coasting. Therefore, it is not possible to appropriately cause the vehicle to coast on the basis of the upward gradient of the road surface, and there may occur the following inconvenience.

When the vehicle is coasting on an upward-gradient road surface, accelerating force acts in a direction opposite to a traveling direction due to gravity, so a coasting distance reduces as compared to that when the vehicle coasts on a flat road or a downward-gradient road surface. Therefore, when the vehicle is caused to travel in the free-run coasting at the time when the upward gradient is large, frequent engine stop and restart occur in a relatively short distance, so the drivability of the vehicle decreases. In contrast to this, engine start and restart are not required in the neutral coasting, so deterioration of drivability does not occur irrespective of the coasting distance. However, if the vehicle is caused to travel in the neutral coasting also at the time when the upward gradient is small, that is, when the coasting distance is long, an opportunity to stop the engine reduces, so the fuel economy of the vehicle relatively deteriorates.

SUMMARY OF THE INVENTION

The invention provides a drive control device for a vehicle, which is able to achieve both fuel economy and drivability when the vehicle coasts on an upward-gradient road surface.

A first aspect of the invention provides a drive control device for a vehicle, which includes an engine and a clutch device provided in a power transmission path between the engine and a drive wheel and configured to interrupt the power transmission in the power transmission path. The drive control device includes: a coasting control unit configured to control normal traveling in which the vehicle is caused to travel while the engine is coupled to the drive wheel, free-run coasting in which the vehicle is caused to coast by releasing the cultch device in a state where the engine is stopped, and neutral coasting in which the vehicle is caused to coast by releasing the clutch device in a state where the engine is operated; and a gradient upper limit value setting unit configured to set an upper limit value of an upward gradient of a road surface at which the vehicle is caused to start traveling in the neutral coasting such that the upper limit value of the upward gradient of the road surface at which the vehicle is caused to start traveling in the neutral coasting is larger than an upper limit of the upward gradient of the road surface at which the vehicle is caused to start traveling in the free-run coasting.

With the drive control device according to the first aspect, an upper limit value of an upward gradient of a road surface at which the vehicle is caused to start traveling in the neutral coasting is set so as to be larger than an upper limit of the upward gradient of the road surface at which the vehicle is caused to start traveling in the free-run coasting, so, when the upward gradient is relatively large and a coasting distance is short, the vehicle is caused to travel in the neutral coasting, and stop and restart of the engine are not carried out. Therefore, a decrease in drivability of the vehicle is suppressed. When the upward gradient is relatively small and the coasting distance is long, the vehicle is caused to travel in the free-run coasting, and supply of fuel to the engine is stopped, so the fuel economy of the vehicle is obtained. Thus, it is possible to achieve both the fuel economy and drivability of the vehicle during coasting on an upward gradient.

In the drive control device according to the above aspect, the coasting control unit may be configured to, during issuance of a coasting request to the vehicle, cause the vehicle to travel in the neutral coasting when the upward gradient of the road surface on which the vehicle travels is larger than or equal to a preset gradient determination value, and cause the vehicle to start traveling in the free-run coasting when the upward gradient of the road surface on which the vehicle travels is smaller than the preset gradient determination value. With this configuration, a decrease in the drivability of the vehicle is suppressed by causing the vehicle to travel in the neutral coasting when the upward gradient is larger than or equal to the preset gradient determination value, and the fuel economy of the vehicle is obtained by causing the vehicle to travel in the free-run coasting when the upward gradient is smaller than the gradient determination value, so it is possible to achieve both the fuel economy and drivability of the vehicle during coasting on an upward gradient.

The drive control device according to the above aspect may be applied to a vehicle that includes at least an engine as a driving force source. For example, the drive control device is applied to the vehicle in which the power of the engine is transmitted to the drive wheel via an automatic transmission; instead, the drive control device may be applied to a hybrid vehicle, or the like, that includes an electric motor or a motor generator as a driving force source in addition to the engine. The engine is, for example, an internal combustion engine that generates power by burning fuel.

In the drive control device according to the above aspect, a clutch device that connects or disconnects the power transmission path between the engine and the drive wheel may be arranged between the engine and the drive wheel, and the engine may be configured to be able to be disconnected from the drive wheel. The clutch device is a hydraulic friction engagement device, such as a hydraulic clutch, provided in series in the power transmission path; instead, various types of clutches that are, for example, able to connect or disconnect the power transmission path by electrically controlling reaction force may be employed. A forward clutch in an automatic transmission that includes a plurality of clutches and brakes and that is able to shift into multiple gear positions may be used. The clutch device that connects or disconnects the power transmission path may be, for example, formed of a planetary gear unit, inserted in the power transmission path and having a pair of rotating elements connected to the power transmission path, and a hydraulic brake configured to inhibit rotation of another rotating element not connected to the power transmission path among the rotating elements of the planetary gear unit.

The invention relates to determination as to whether the vehicle is caused to start traveling in the free-run coasting or the neutral coasting. A condition to cause the vehicle to start traveling in the free-run coasting or the neutral coasting is, for example, such that, in addition to a condition that the accelerator pedal has been returned to an original position or a position close to the original position in a relatively high-speed steady travel state where the power transmission path from the engine to the drive wheel is connected by the clutch, the gear position of the automatic transmission is higher than or equal to the predetermined high-speed-side gear position, the vehicle speed is a relatively high vehicle speed higher than or equal to a predetermined vehicle speed, and the accelerator operation amount falls within a predetermined range, an upper limit value of an upward gradient of a road surface at which the vehicle is caused to start traveling in the neutral coasting may be set so as to be larger than an upper limit of the upward gradient of the road surface at which the vehicle is caused to start traveling in the free-run coasting on the basis of the upward gradient of the road surface at that time.

The vehicle may be caused to start traveling in the free-run coasting at the time when the upward gradient of the road surface on which the vehicle is traveling in the neutral coasting has decreased to the upper limit value of the upward gradient of the road surface at which the vehicle is caused to start traveling in the free-run coasting.

The gradient determination value may be a preset constant value. The gradient determination value may be a function of vehicle state, such as a battery remaining level, an engine coolant temperature and the need for hydraulic pressure, and may be variably set in consideration of those vehicle states. These variable settings may be such that the gradient determination value is continuously varied or may be varied in a stepwise manner including two steps, and are determined in form of a data map, an arithmetic expression, or the like, in advance. The above function may be, for example, set such that the gradient determination value reduces with a decrease in the battery remaining level, a decrease in the engine coolant temperature or an increase in the need for hydraulic pressure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a view that illustrates two coasting modes that are executed by the vehicle drive device shown in FIG. 1;

FIG. 3 is a view that illustrates an upward gradient of a road surface;

FIG. 4 is a view that illustrates a relationship between neutral coasting and free-run coasting that are started by the electronic control unit shown in FIG. 1 in association with an upward gradient;

FIG. 5 is a graph that shows an example of a data map that is used at the time when a gradient determination value α shown in FIG. 4 is set on the basis of a battery remaining level, an engine coolant temperature and the need for hydraulic pressure;

FIG. 6 is a flowchart that illustrates control operations relating to determination as to whether a vehicle is caused to start coasting, which are executed by the electronic control unit shown in FIG. 1;

DETAILED DESCRIPTION OF EMBODIMENTS

Hereinafter, an embodiment of the invention will be described in detail with reference to the accompanying drawings.

Figure 1:
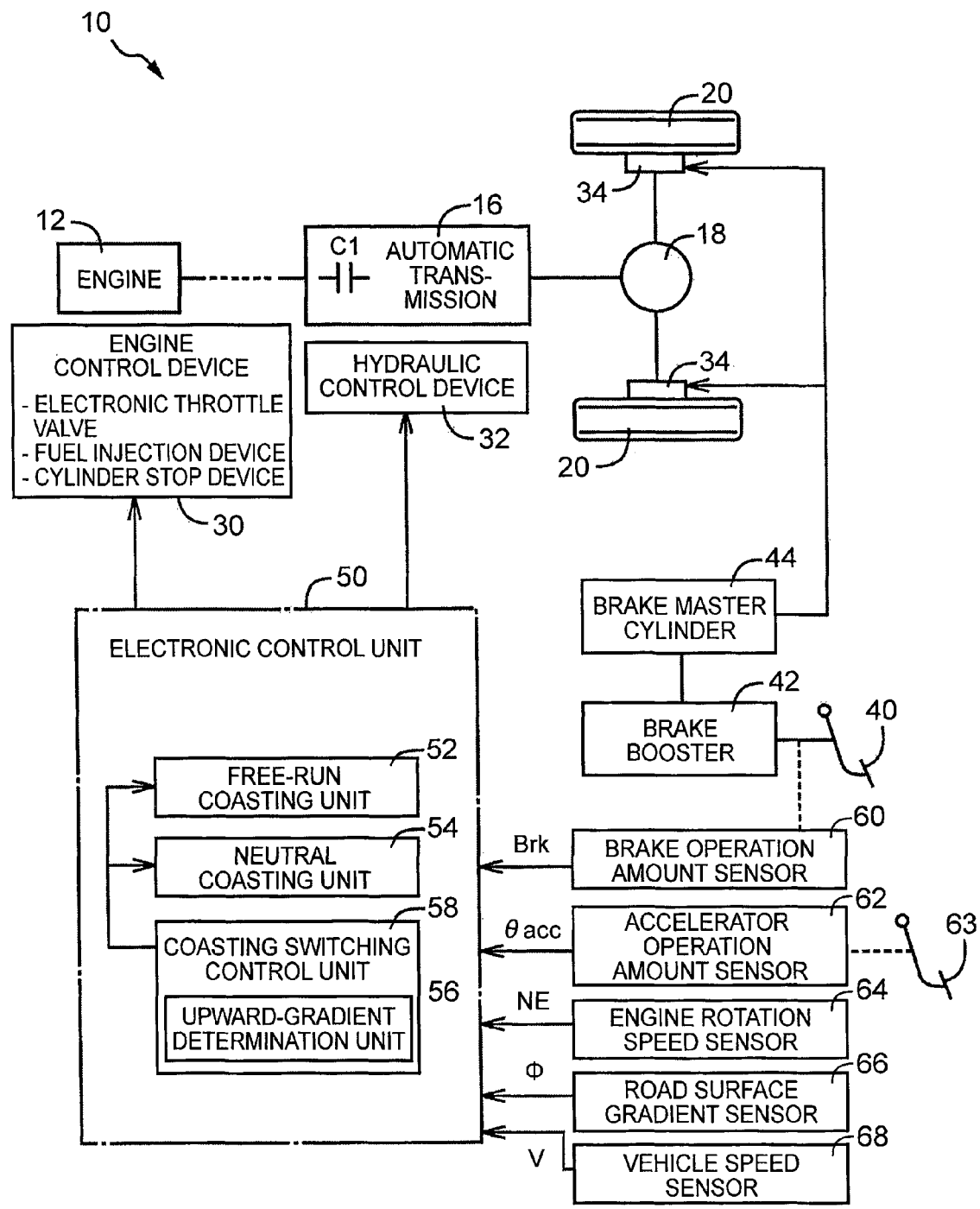
FIG. 1 is a schematic configuration view that shows a skeletal view of a vehicle drive device together with a relevant portion of control functions of an electronic control unit.

FIG. 1 is a schematic configuration view that shows a vehicle drive device 10 together with a relevant portion of control functions of an electronic control unit 50 corresponding to a drive control device of the vehicle drive device 10. The vehicle drive device 10 includes an engine 12 as a driving force source. The engine 12 is an internal combustion engine, such as a gasoline engine and a diesel engine, that generates power by burning fuel. The output of the engine 12 is transmitted from an automatic transmission 16 to right and left drive wheels 20 via a differential gear unit 18. A damper device and a power transmission device, such as a torque converter, are provided between the engine 12 and the automatic transmission 16, and a motor generator that functions as a driving force source may be arranged between the engine 12 and the automatic transmission 16.

The engine 12 includes an engine control device 30 having various devices, such as an electronic throttle valve and a fuel injection device, required for controlling the output of the engine 12. The electronic throttle valve is used to control an intake air amount. The fuel injection device is used to control the amount of fuel supplied. The electronic throttle valve and the fuel injection device are basically controlled on the basis of an operation amount of an accelerator pedal 63, that is, accelerator operation amount θacc, which is a driver's output request amount. The fuel injection device is able to stop supply of fuel (fuel cut F/C), for example, when the accelerator operation amount θacc is 0 or close to 0 or the accelerator is off, even while the vehicle is travelling.

The automatic transmission 16 is, for example, a step-shift automatic transmission, such as a planetary gear type, in which a plurality of gears having different speed ratios γ(=input shaft rotation speed/output shaft rotation speed) are established by engaged/released states of a plurality of hydraulic friction engagement devices (clutches and brakes). Shift control over the automatic transmission 16 is carried out by electromagnetic hydraulic control valves, selector valves, and the like, provided in a hydraulic control device 32. A clutch C1 functions as an input clutch of the automatic transmission 16, and similarly undergoes engaging/releasing control by the hydraulic control device 32. The clutch C1 functions as a clutch device that connects or disconnects a power transmission path between the engine 12 and the drive wheels 20. In addition, a parallel-shaft constant-mesh step-shift transmission or a continuously variable transmission, such as a belt type, with a forward/reverse switching gear mechanism may be used as the automatic transmission 16. In the case of the parallel-shaft constant-mesh step-shift transmission, the power transmission path is released by setting sleeves of all the synchromeshes at respective neutral positions with the use of corresponding actuators. In the case of the continuously variable transmission, the power transmission path is released by releasing forward and reverse traveling friction engagement devices provided in the forward/reverse switching gear mechanism. In these cases, the synchromeshes and the actuators that switch the synchromeshes or the forward and reverse traveling friction engagement devices function as the clutch device.

A wheel brake 34 is provided at each of the drive wheels 20. The wheel brakes 34 generate braking force on the basis of brake operation force (depression force) Brk of a brake pedal 40 that is operated by a driver. The brake operation force Brk serves as a brake request amount. In the present embodiment, brake hydraulic pressure is mechanically generated from a brake master cylinder 44 via a brake booster 42 on the basis of the brake operation force Brk, and braking force is generated by the brake hydraulic pressure. The brake booster 42 amplifies the brake operation force Brk by utilizing negative pressure that is generated by the rotation of the engine 12. Brake hydraulic pressure that is output from the brake master cylinder 44 is amplified by the brake booster 42, and large braking force is obtained. The brake pedal 40 functions as a brake operation member.

The thus configured vehicle drive device 10 includes the electronic control unit 50. The electronic control unit 50 is configured to include a so-called microcomputer that includes a CPU, a ROM, a RAM, an input/output interface, and the like, and executes signal processing in accordance with programs prestored in the ROM while utilizing a temporary storage function of the RAM. A signal that indicates a brake operation force Brk (kPa) is supplied from a brake operation amount sensor 60 to the electronic control unit 50. A signal that indicates the accelerator operation amount θacc (%), that is the operation amount of the accelerator pedal 63, is supplied from an accelerator operation amount sensor 62 to the electronic control unit 50. A signal that indicates a rotation speed NE (rpm) of the engine 12 is supplied from an engine rotation speed sensor 64 to the electronic control unit 50, and, for example, a signal that indicates a gradient Φ (angle) of a road surface R is supplied from a road surface gradient sensor 66 to the electronic control unit 50. The road surface gradient sensor 66 detects a longitudinal acceleration. Other than the above, various pieces of information required for various controls are supplied. In addition, a signal that indicates a vehicle speed V (km/h) is supplied from a vehicle speed sensor 68 to the electronic control unit 50.

The electronic control unit 50 executes, for example, output control and rotation stop control over the engine 12 on the basis of the accelerator operation amount θacc, the brake operation amount, and the like, corresponding to a driver's intention to accelerate and shift control for controlling a gear position of the automatic transmission 16 on the basis of a required output based on the accelerator operation amount θacc corresponding to a driver's intention to acceleration or on the basis of the accelerator operation amount θacc and the vehicle speed V by consulting a prestored shift line map.

The automatic transmission 16 is configured to merely establish a predetermined gear on the basis of the vehicle speed V, and the like, in a coasting state where the accelerator operation amount θacc is zero, and the clutch C1 is kept in an engaged state. In this engine braking traveling, the engine 12 that is autonomously operated is driven at a predetermined rotation speed that is determined on the basis of the vehicle speed V and the speed ratio γ, and engine braking force corresponding to the rotation speed is generated. In addition, the engine 12 is driven at the predetermined rotation speed, so the amplification action of the brake booster 42 for amplifying the brake operation force Brk by utilizing negative pressure generated through the engine rotation is appropriately obtained, and controllability of braking force through brake operation is sufficiently obtained.

The electronic control unit 50 further includes a free-run coasting unit 52, a neutral coasting unit 54, a coasting switching control unit 58, and the like. The coasting switching control unit 58 includes an upward-gradient determination unit 56. As shown in FIG. 2, the free-run coasting unit 52 is used to execute free-run coasting by releasing the clutch C in a state where rotation of the engine 12 is stopped by carrying out fuel cut (F/C) at the time when the accelerator pedal 63 is returned. In this case, the engine braking force becomes smaller than that in the above-described engine braking traveling, and the engine braking force becomes substantially 0 because the clutch C1 is released, so travel resistance reduces and a travel distance through coasting extends, and, as a result, it is possible to improve fuel economy. The neutral coasting unit 54 is used to execute neutral coasting by releasing the clutch C1 in a state where rotation of the engine 12 is maintained without fuel cut (F/C) at the time when the accelerator pedal 63 is returned. In this case as well, the engine braking force becomes smaller than that in the above-described engine braking traveling, and the engine braking force becomes substantially 0 because the clutch C1 is released, so travel resistance reduces and a travel distance through coasting extends, and, as a result, it is possible to improve fuel economy; however, fuel for keeping the rotation speed at the time when the accelerator of the engine 12 is off is required. The rotation speed NE of the engine 12 during neutral coasting, that is, when the accelerator pedal is returned, is, for example, an idle rotation speed of about 700 rpm after warm-up, and is, for example, a rotation speed of about 1200 rpm during warming up, during charging, or the like.

The upward-gradient determination unit 56 determines whether the upward gradient Φ of the road surface R on which the vehicle is traveling, detected by the road surface gradient sensor 66, is larger than or equal to a preset gradient determination value α. The upward gradient Φ takes a positive value as shown in FIG. 3 in upward gradient, and takes a negative value in downward gradient.

The coasting switching control unit 58, for example, selectively switches into one of two drive modes, that is, free-run coasting and neutral coasting, when a coasting start condition including accelerator pedal return operation, such as accelerator off operation, is satisfied. When a coasting end condition is satisfied, coasting till then is ended. In addition, the coasting switching control unit 58 causes the vehicle to travel in the above-described engine braking traveling when the coasting start condition is not satisfied.

In the free-run coasting and the neutral coasting, for example, in a relatively high-speed steady travel state where the power transmission path from the engine 12 to the drive wheels 20 is connected by the clutch C1, the gear position of the automatic transmission 16 is set to a forward gear position higher than or equal to a predetermined high-speed-side gear position and the vehicle speed V (km/h) is higher than or equal to a predetermined speed, a start condition relating to the upward gradient Φ of the road surface R is included in addition to a start condition that the accelerator pedal 63 has been returned to an original position or a position close to the original position. In the start condition relating to the upward gradient Φ, an upper limit value θf1 of the upward gradient Φ for the free-run coasting differs from an upper limit value θn1 of the upward gradient Φ for the neutral coasting, and, as shown in FIG. 4, the upper limit value θn1 of the upward gradient Φ of the road surface R at which the vehicle is caused to start traveling in the neutral coasting is set so as to be larger than the upper limit value θf1 of the upward gradient Φ of the road surface R at which the vehicle is caused to start traveling in the free-run coasting (θn1>θf1). Therefore, when the coasting switching control unit 58 determines that the accelerator pedal 63 has been rapidly returned in the relatively high-speed steady travel state, the coasting switching control unit 58, for example, on the upward-gradient road surface R, causes the vehicle to start traveling in one of the free-run coasting and the neutral coasting on the basis of whether the upward gradient Φ of the road surface R is larger than or equal to the preset gradient determination value α(=θf1). For example, in (a) of FIG. 4, the neutral-coasting unit 54 causes the vehicle to start traveling in the neutral coasting when the upward gradient Φ of the road surface R is larger than or equal to the preset gradient determination value α, and the free-run coasting unit 52 causes the vehicle to start traveling in the free-run coasting when the upward gradient Φ of the road surface R is smaller than the preset gradient determination value α. In addition, in (b) of FIG. 4, the neutral coasting unit 54 causes the vehicle to start traveling in the neutral coasting when the upward gradient Φ of the road surface R is larger than or equal to the preset gradient determination value α, and the coasting switching control unit 58 causes the vehicle to start traveling in one of the neutral coasting and the free-run coasting on the basis of another condition, such as a distance to a vehicle ahead and a vehicle speed, when the upward gradient Φ of the road surface R is smaller than the preset gradient determination value α.

FIG. 3 is a view that illustrates the upward gradient Φ of the road surface R on which the vehicle travels. The upward gradient Φ takes a positive value when the road surface R has an upward gradient, and takes a negative value when the road surface R has a downward gradient.

In the start condition relating to the upward gradient Φ, for example, the upper limit value θf1 of the upward gradient Φ at which the vehicle is caused to start traveling in the free-run coasting may be set so as to be equal to a lower limit value θf1 of the upward gradient Φ at which the vehicle is caused to start traveling in the neutral coasting as shown in (a) of FIG. 4, or a lower limit value θn2(0) of the upward gradient Φ at which the vehicle is caused to start traveling in the free-run coasting is set so as to be equal to a lower limit value θn2(0) of the upward gradient Φ at which the vehicle is caused to start traveling in the neutral coasting as shown in (b) of FIG. 4, or the lower limit value θn2(0) of the upward gradient Φ at which the vehicle is caused to start traveling in the free-run coasting is set so as to be smaller than a lower limit value of the upward gradient Φ at which the vehicle is caused to start traveling in the neutral coasting as shown in (c) of FIG. 4.

The coasting switching control unit 58 ends the free-run coasting or the neutral coasting, for example, when the accelerator is depressed.

The gradient determination value α may be a predetermined constant value, or may be, for example, set using the road surface gradient Φ as a parameter as shown in FIG. 5. That is, as shown in FIG. 5, the gradient determination value α may be a function of vehicle state, such as a battery remaining level, an engine coolant temperature and the need for hydraulic pressure, and may be variably set in consideration of those vehicle states. These variable settings may be such that the gradient determination value α is continuously varied or may be varied in a stepwise manner including two steps, and are determined in form of a data map, an arithmetic expression, or the like, in advance. The above function may be, for example, set such that the gradient determination value α reduces with a decrease in the battery remaining level, a decrease in the engine coolant temperature or an increase in the need for hydraulic pressure.

FIG. 6 is a flowchart that illustrates a relevant portion of control operations of the electronic control unit 50, that is, control operations through which the coasting switching control unit 58 determines whether the vehicle is caused to start traveling in the free-run coasting or the neutral coasting on the basis of the road surface gradient Φ and then the vehicle is caused to start traveling in the determined one of the free-run coasting and the neutral coasting.

In FIG. 6, in step S1 (hereinafter, step is omitted), it is determined whether an execution start condition that the vehicle is caused to start one of the free-run coasting and the neutral coasting, other than the condition relating to the upward gradient Φ of the road surface R, is satisfied. The execution start condition is, for example, a condition that the accelerator pedal has been returned to an original position or a position close to the original position in a relatively high-speed steady travel state where the power transmission path from the engine 12 to the drive wheels 20 is connected by the clutch C1, the gear position of the automatic transmission 16 is higher than or equal to the predetermined high-speed-side gear position, for example, the speed ratio γ is set to a forward gear lower than or equal to 1, the vehicle speed V is a relatively high vehicle speed higher than or equal to a predetermined vehicle speed V1, for example, 70 km/h, and the accelerator operation amount θacc falls within a predetermined range, for example, is lower than or equal to 30%.

When negative determination is made in S1, a standby is carried out by repeatedly executing S1. When affirmative determination is made in S1 in this state, it is determined in S2 corresponding to the upward-gradient determination unit 56 whether the upward gradient Φ of the road surface R on which the vehicle is traveling is larger than or equal to the preset gradient determination value α. When affirmative, determination is made in S2, the vehicle is caused to start traveling in the neutral coasting in S3 corresponding to the coasting switching control unit 58. However, when negative determination is made in S2, the vehicle is caused to start traveling in the free-run coasting in S4 corresponding to the coasting switching control unit 58.

Figure 7:
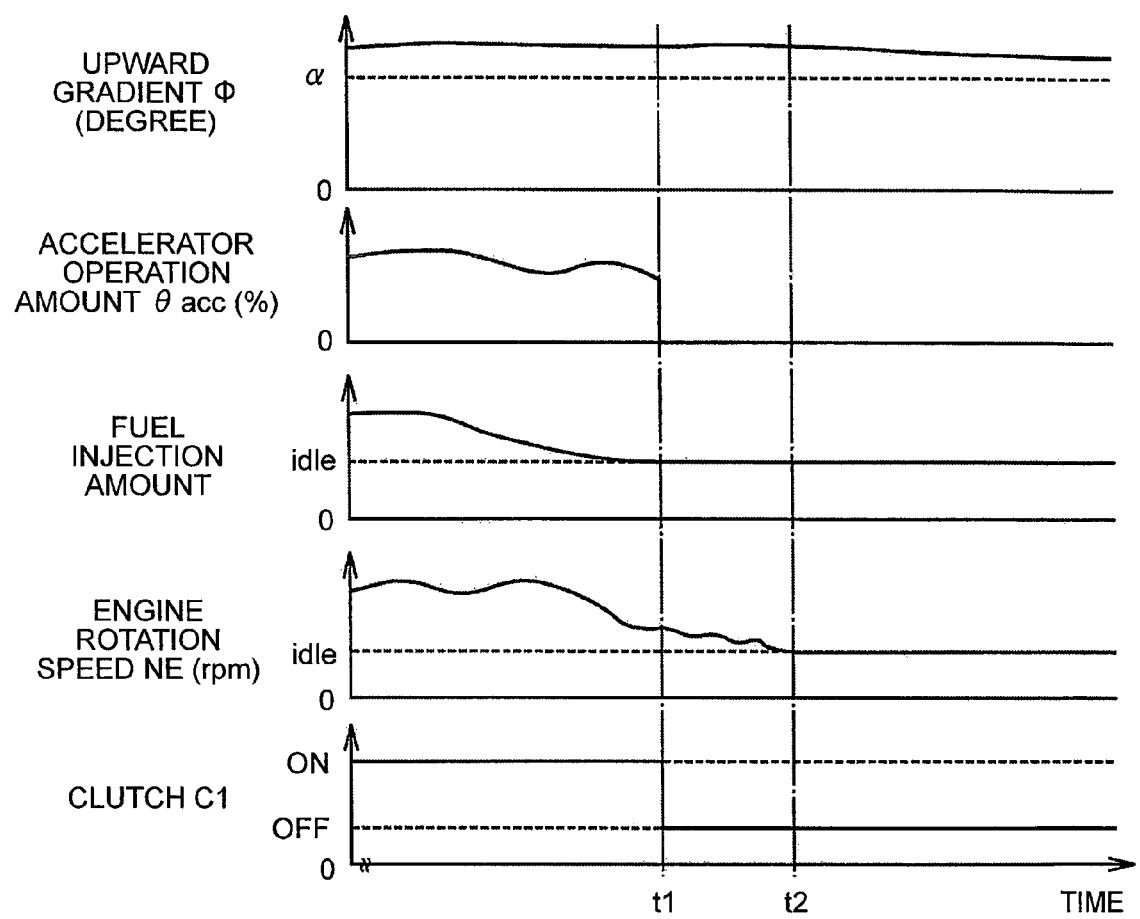
FIG. 7 is a time chart that illustrates the operation of the neutral coasting determined to be started by the electronic control unit shown in FIG. 1.

The vehicle is caused to start traveling in the neutral coasting in S3 at t1 timing at which affirmative determination is made in S2 because the accelerator pedal has been returned to the original position and the accelerator operation amount θacc becomes zero as shown in the time chart of FIG. 7. At t1 timing, the power transmission path between the drive wheels 20 and the engine 12 is released by releasing the clutch C1, and the engine rotation speed NE decreases toward idle rotation at that time and then the rotation is kept. t2 timing indicates this state.

Figure 8:
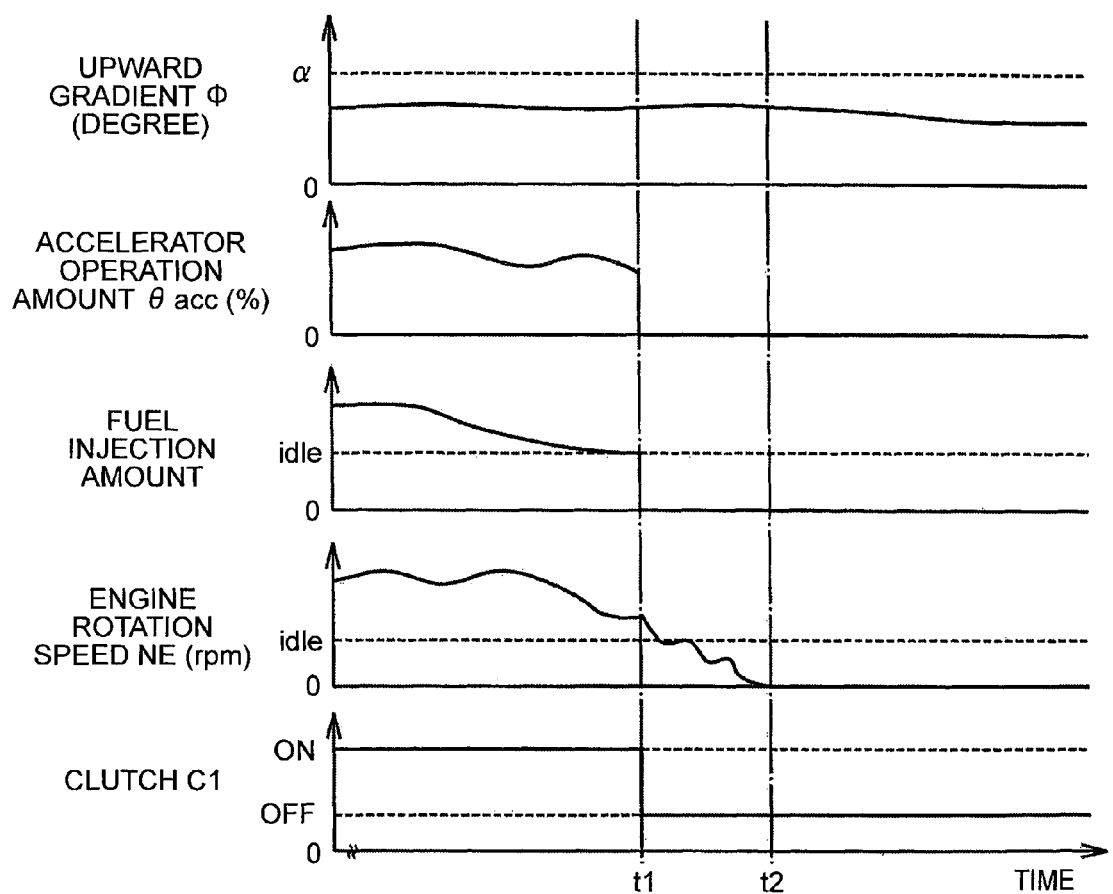
FIG. 8 is a time chart that illustrates the operation of the free-run coasting determined to be started by the electronic control unit shown in FIG. 1.

The vehicle is caused to start traveling in the free-run coasting in S4 at t1 timing at which affirmative determination is made in S2 because the accelerator pedal has been returned to the original position and the accelerator operation amount θacc becomes zero as shown in the time chart of FIG. 8. At t1 timing, the power transmission path between the drive wheels 20 and the engine 12 is released by releasing the clutch C1, and the operation and rotation of the engine 12 are stopped by cutting a fuel injection amount to the engine 12. t2 timing indicates this state.

As described above, with the electronic control unit 50 provided in the vehicle drive device 10 according to the present embodiment, the upper limit value θn1 of the upward gradient of the road surface R at which the vehicle is caused to start traveling in the neutral coasting is set so as to be larger than the upper limit value θf1 of the upward gradient of the road surface R at which the vehicle is caused to start traveling in the free-run coasting, so, when the upward gradient is relatively large and the coasting distance is short, the vehicle is caused to travel in the neutral coasting, and stop and restart of the engine 12 are not carried out. Thus, a decrease in the drivability of the vehicle is suppressed. When the upward gradient is relatively small and the coasting distance is long, the vehicle is caused to travel in the free-run coasting, and supply of fuel to the engine 12 is stopped, so the fuel economy of the vehicle is obtained. Thus, it is possible to achieve both the fuel economy and drivability of the vehicle during coasting on an upward gradient.

With the electronic control unit 50 provided in the vehicle drive device 10 according to the present embodiment, during issuance of a coasting request to the vehicle, the vehicle is caused to start traveling in the neutral coasting when the upward gradient Φ of the road surface R on which the vehicle travels is larger than or equal to the preset gradient determination value α, and is caused to start traveling in the free-run coasting when the upward gradient Φ of the road surface R on which the vehicle travels is smaller than the preset gradient determination value α. Therefore, a decrease in the drivability of the vehicle is suppressed by causing the vehicle to travel in the neutral coasting when the upward gradient Φ is larger than or equal to the preset gradient determination value α, and the fuel economy of the vehicle is obtained by causing the vehicle to travel in the free-run coasting when the upward gradient Φ is smaller than the gradient determination value α, so it is possible to achieve both the fuel economy and drivability of the vehicle during coasting on an upward gradient.

The embodiment of the invention is described in detail above with reference to the accompanying drawings; however, the invention is also applied to other alternative embodiments.

In the present embodiment, the upward gradient Φ is obtained from the road surface gradient sensor 66, such as a G sensor that detects a longitudinal acceleration; however, means for acquiring information about the upward gradient Φ is not limited to the road surface gradient sensor 66. For example, the upward gradient Φ may be obtained on the basis of an actual driving force of the engine 12 or a throttle valve opening degree and a vehicle speed from a prestored relationship between the driving force of the engine 12 or throttle opening degree and the vehicle speed on a flat road or on the basis of an actual point from prestored map information, or the like.

The above embodiment is only illustrative. The invention may be modified or improved in various forms on the basis of the knowledge of persons skilled in the art.

The invention claimed is:

1. A drive control device for a vehicle, which includes an engine and a clutch device provided in a power transmission path between the engine and a drive wheel, and the clutch device configured to interrupt the power transmission in the power transmission path, comprising:
   an electronic control unit configured to control normal traveling in which the vehicle is caused to travel while the engine is coupled to the drive wheel, free-run coasting in which the vehicle is caused to coast by releasing the clutch device in a state where the engine is stopped, and neutral coasting in which the vehicle is caused to coast by releasing the clutch device in a state where the engine is operated; and
   the electronic control unit configured to set an upper limit value of an upward gradient of a road surface at which the vehicle is caused to start traveling in the neutral coasting such that the upper limit value of the upward gradient of the road surface at which the vehicle is caused to start traveling in the neutral coasting is larger than an upper limit value of the upward gradient of the road surface at which the vehicle is caused to start traveling in the free-run coasting.

2. The drive control device according to claim 1, wherein the electronic control unit is configured to, during issuance of a coasting request to the vehicle, cause the vehicle to start traveling in the neutral coasting when the upward gradient of the road surface on which the vehicle travels is larger than or equal to a preset gradient determination value, and cause the vehicle to start traveling in the free-run coasting when the upward gradient of the road surface on which the vehicle travels is smaller than the preset gradient determination value.

* * * * *